March 16, 1926.

V. MacKAY

STOKER

Original Filed Nov. 12, 1921     7 Sheets-Sheet 1

1,577,408

Inventor
VASIL MACKAY.

By Eccleston & Eccleston
Attorneys

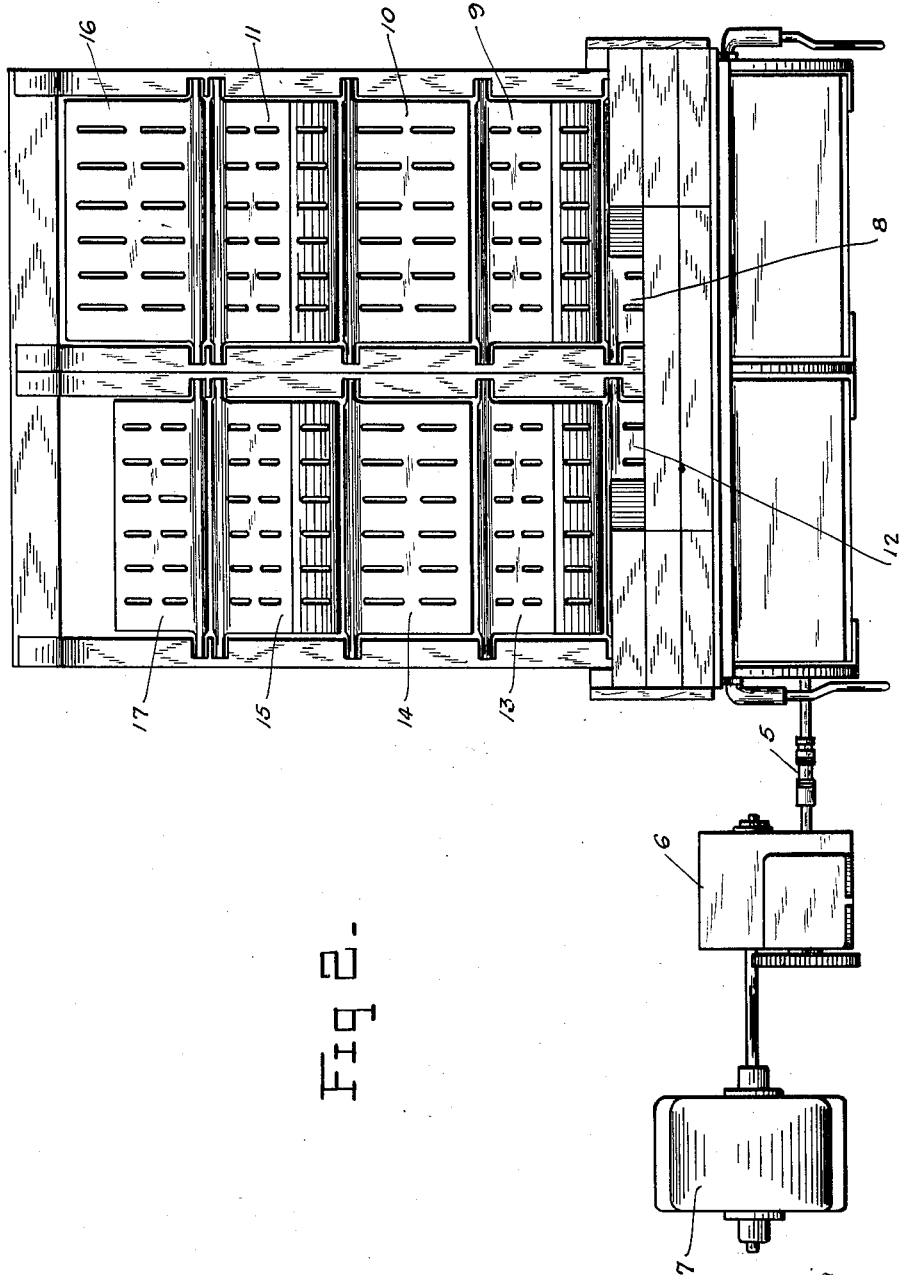

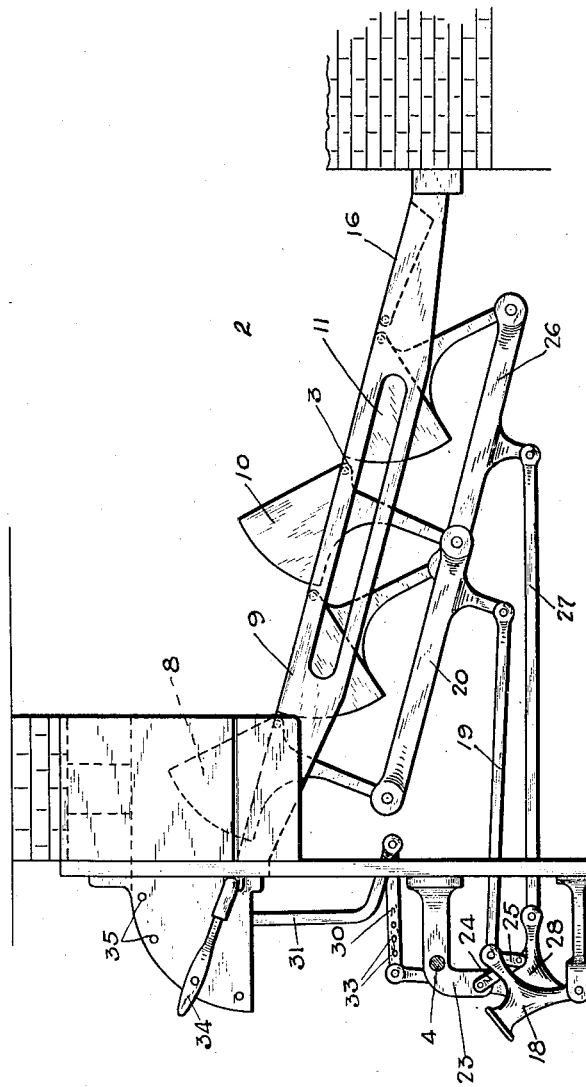

March 16, 1926.
V. MacKAY
1,577,408
STOKER
Original Filed Nov. 12, 1921    7 Sheets-Sheet 4
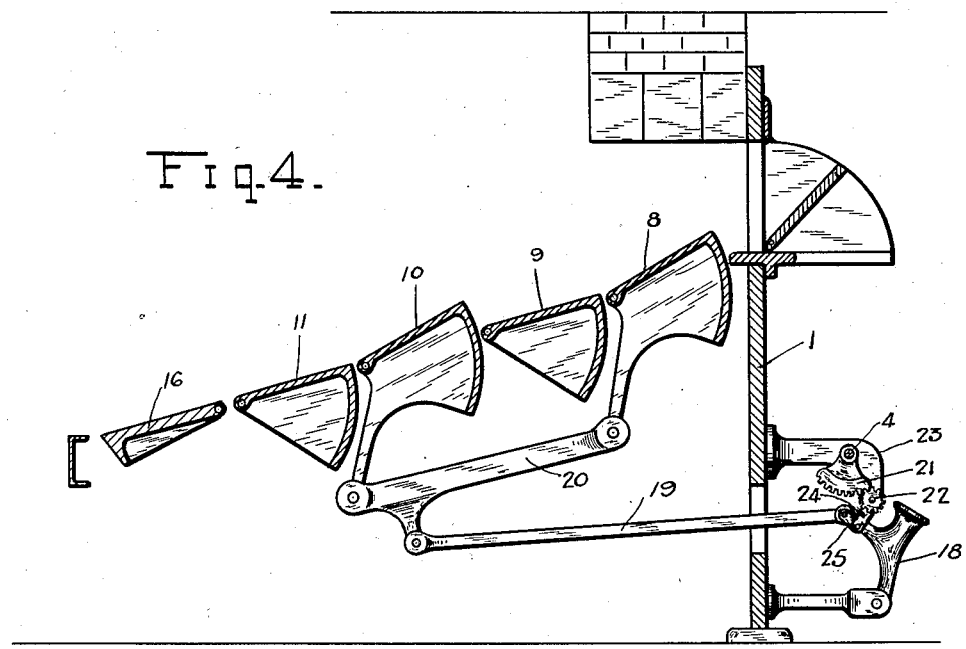
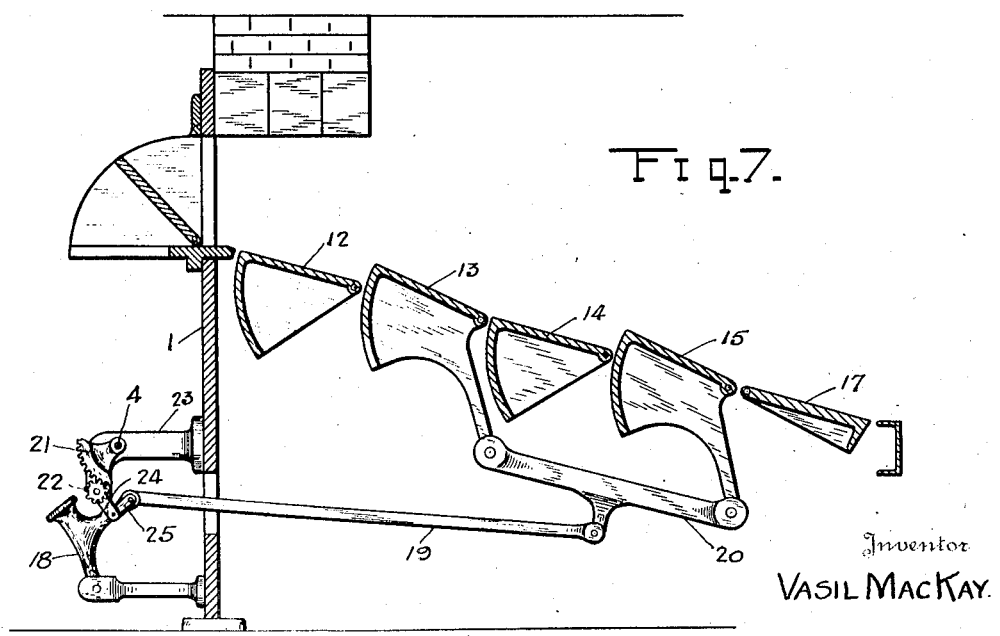
Inventor
VASIL MacKAY.
Eccleston & Eccleston
Attorneys Inventor
VASIL MACKAY.

March 16, 1926.

V. MacKAY

STOKER

Original Filed Nov. 12, 1921    7 Sheets-Sheet 6

1,577,408

Inventor
VASIL MACKAY.
Eccleston & Eccleston
By
Attorneys

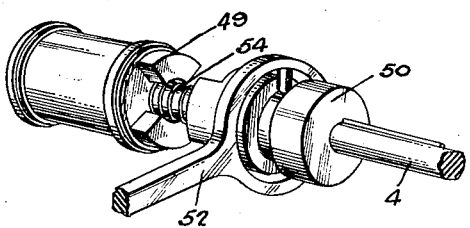
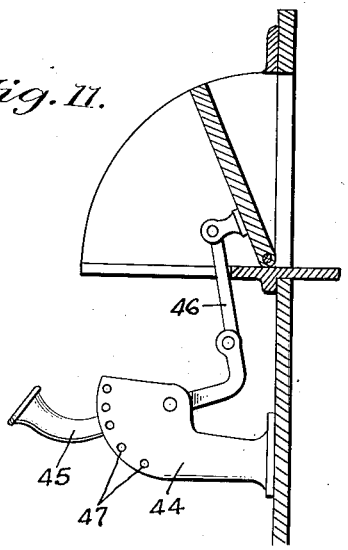
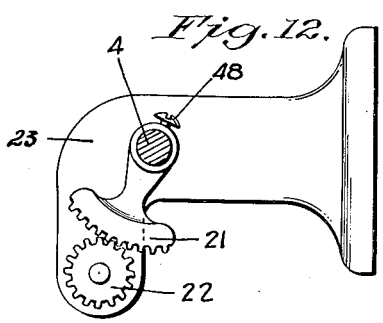
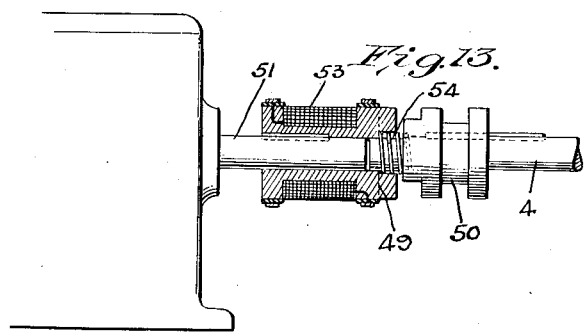
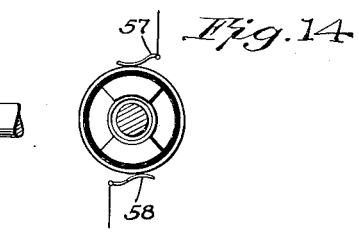
Inventor
VASIL MACKAY.

Patented Mar. 16, 1926.

1,577,408

UNITED STATES PATENT OFFICE.

VASIL MacKAY, OF WASHINGTON, DISTRICT OF COLUMBIA.

STOKER.

Application filed November 12, 1921, Serial No. 514,752. Renewed September 17, 1925.

*To all whom it may concern:*

Be it known that I, VASIL MACKAY, a citizen of the United States, and resident of Washington, in the District of Columbia, have invented certain new and useful Improvements in Stokers, of which the following is a full, clear, and exact description thereof.

My invention relates to stoking mechanism, and one of the objects is to provide an improved construction thereof, whereby the operating shaft and associated mechanism is accessible to the fireman, so that its condition is apparent at all times, and it will thus be kept properly oiled, etc.

Another object of the invention is to provide such an arrangement of parts that when the mechanical operation of the driving shaft is discontinued, the grates may be operated by hand, and without the necessity of first disconnecting some of the parts.

Another purpose of my invention is to provide an operating mechanism so constructed that it will permit a selective operation of the grates.

Still another purpose of the invention is to provide a new and improved hopper, and a new and improved means for operating the feeding door of the hopper, and also in the provision of means whereby the hopper door may be operated either manually or mechanically.

Another object of the invention is to provide an arch over the fuel entrance, which is of simple construction and inexpensive in manufacture.

Another important feature of the invention resides in the provision of means whereby the stoker is operated at certain predetermined intervals, and also in the provision of means whereby the intervals may be varied.

Further objects of my invention will appear as the description proceeds.

I will now describe one particular form of the invention, it being understood that those skilled in the art may make changes and modifications therein without departing from the spirit of the invention as defined in the appended claims; and the drawings forming part of this specification are therefore to be considered as illustrative, and not in any limiting sense.

In the drawings:

Figure 2 is a plan view of the grate and operating mechanism.

Figure 3 is a side elevation of the rocking grate and means for operating the same.

Figure 4 is a vertical sectional view taken on the line 4—4 of Fig. 1, and looking in the direction of the arrows.

Figure 7 is a vertical sectional view taken on the line 7—7 of Fig. 1, and looking in the direction of the arrows.

Figure 10 is a detail perspective view of the clutch mechanism.

Figure 11 is a side elevation of one of the hand operating means for the hopper door.

Figure 12 is a detail view of the connection between the driving shaft and the grate operating mechanism.

Figure 13 is a detail view of the electrically operated clutch, the magnetic coil section of the clutch being in section; and, Figure 14 is a transverse vertical sectional view of the magnetic coil portion of the clutch.

Figure 1:
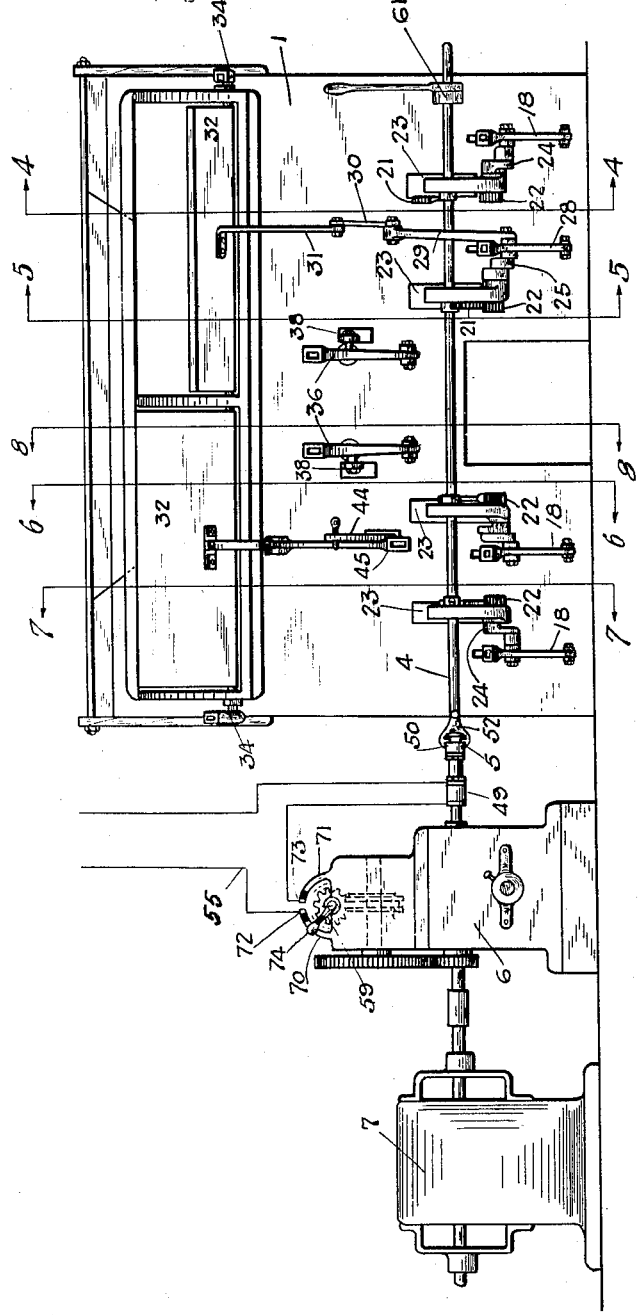
Figure 1 is a front view of the furnace and the stoker operating mechanism.

Referring to the drawings more in detail, numeral 1 indicates the front wall of the furnace, in the firebox 2 of which is mounted in any desired manner the rocking grate 3.

Numeral 4 refers to the main driving shaft mounted on the furnace front, and connected by means of the clutch 5 with the reducing gear 6, which in turn is shown as driven by the motor 7. In place of the motor, a steam engine or any other source of power may be employed.

The rocking feeding bars on the right of the furnace are indicated by numerals 8, 9, 10 and 11 respectively; and on the left of the furnace by the numerals 12, 13, 14 and 15, respectively. The dumping grates are indicated by numerals 16 and 17.

The specific means by which the bars are rocked, both mechanically and by hand, will now be described.

The means for operating the bars on the right and left of the furnace are substantially the same, but there are some differences and for that reason the mechanism for operating the two sets will be described separately; the bars on the right of the furnace being considered first.

With particular reference to Figures 3 and 4, numeral 18 refers to a lever which is connected by a link 19 to the bar 20, which operatively connects the two bars 8 and 10. In order to operate the bars 8 and 10 by hand it is only necessary to rock the operating lever 18. To operate these grates mechanically I provide on the driving shaft 4 a segmental gear 21 which at intervals meshes with and rotates the pinion 22 mounted on bracket 23. Rigidly connected to the pinion 22 is an arm 24, and this arm is connected to the hand operating lever by a link 25.

It will now be clear that as the driving shaft rotates, the segmental gear will, at intervals, mesh with the pinion 22, rotating it through a complete revolution and will thereby rock the grate bars 8 and 10 upwardly, and then lower them into their normal position. The intermeshing teeth of the pinion and segmental gear are equal in number, in order that there may be a complete revolution of the pinion, as above described. It will also be clear that at all times when the pinion and segmental gear are out of mesh the grate bars may be rocked by hand simply by operating the lever 18.

For the purpose of operating the shaft 4 by hand, I provide thereon any suitable ratchet mechanism 61, (Fig. 1). The ratchet mechanism 61 will form the subject-matter of a separate application.

For operating the bars 9 and 11, I provide means similar to the means just described, with the exception that the hopper door is connected with the grate bar operating means.

Figure 5:
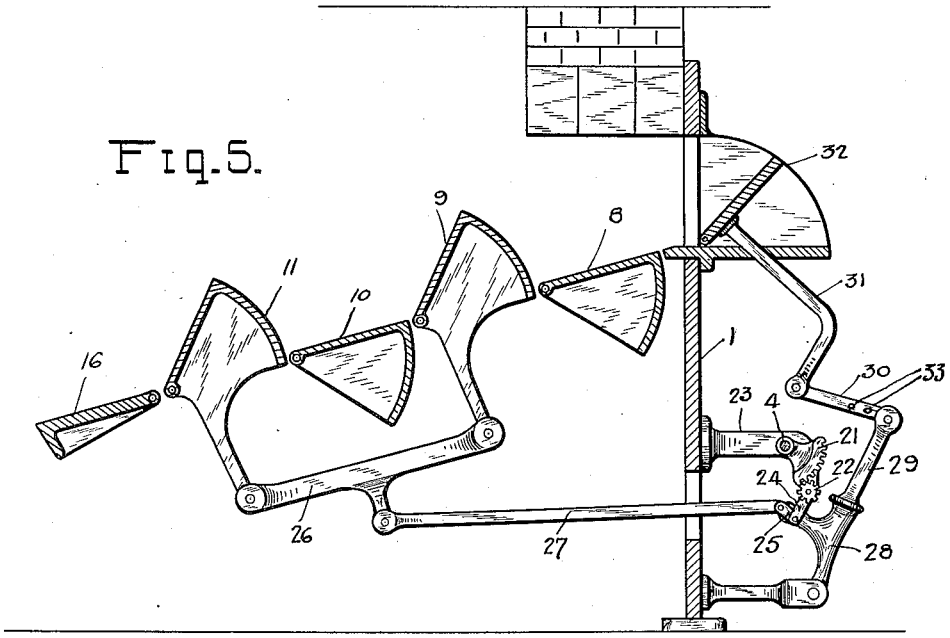
Figure 5 is a vertical sectional view taken on the line 5—5 of Fig. 1, and looking in the direction of the arrows.

With particular reference to Figures 3 and 5, numeral 26 indicates a bar operatively connecting the two rocking feeding bars 9 and 11, and this bar is connected by means of link 27, with the operating lever 28, whereby the bars may be rocked manually.

The mechanism for operating these grate bars mechanically is similar to that already described, and consists of the segmental gear 21, pinion 22, and links 24 and 25.

The difference in structure to be noted is that the operating lever 28 carries an arm 29 which is connected by a link 30 to the bent arm 31 rigidly connected to the hopper door 32, which is pivotally mounted, as clearly shown in the drawings. Numeral 33 refers to holes for adjusting the relative position of the hopper door and the operating lever; and it will be understood, of course, that the link 30 may be disconnected entirely from the arm 29, and in that event the hopper door would be operated by the lever 34 (Fig. 3), and held in adjusted position by means of a pin engaging the lever and holes 35.

It may be noted here that the hopper doors 32 are of such size that they do not strike the furnace front when in a vertical position, but instead are short enough to pass through the opening and into the furnace. The purpose of this construction is to prevent the fuel from becoming jammed between the movable door and the top of the furnace opening, as often happens when the hopper door is of such height as to overlap the door frame.

Figure 6:
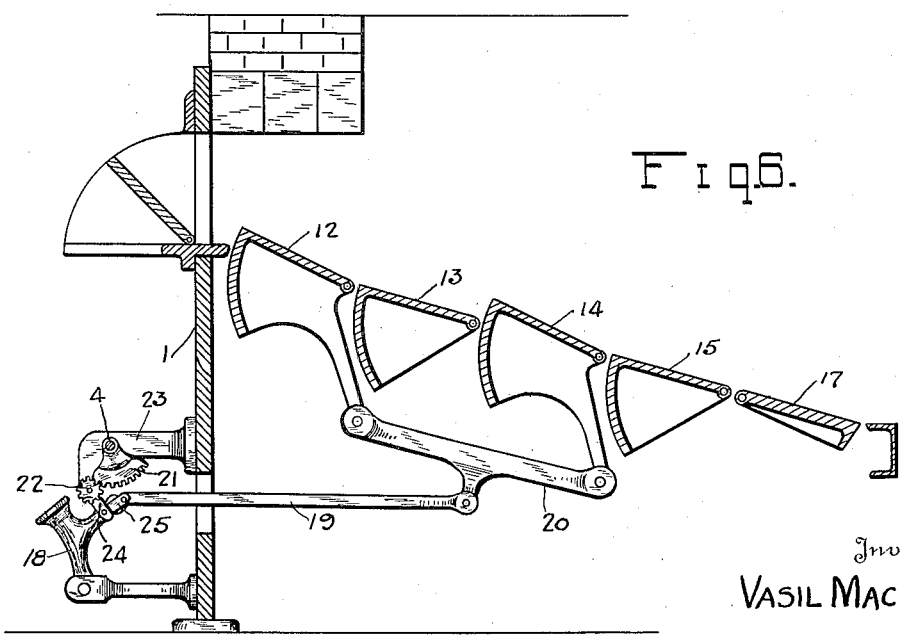
Figure 6 is a vertical sectional view taken on the line 6—6 of Fig. 1, and looking in the direction of the arrows.

Figure 6 shows the means for operating the grate bars 12 and 14, which bars are in alignment with bars 8 and 10. The means for operating these bars is similar to the means described in connection with the bars 8 and 10, and no further description thereof is necessary. The same reference numerals have been applied to similar parts.

Figure 7 shows the means for operating the bars 13 and 15, which bars are aligned with bars 9 and 11. The operating means is similar to the means employed in connection with the operation of bars 8 and 10, and bars 12 and 14, and the same reference numerals have been applied to corresponding parts. It is to be noted that in this instance the grate bar operating mechanism is not shown as connected with the hopper door. The means for operating this hopper door manually will be described hereinafter.

Figure 8:
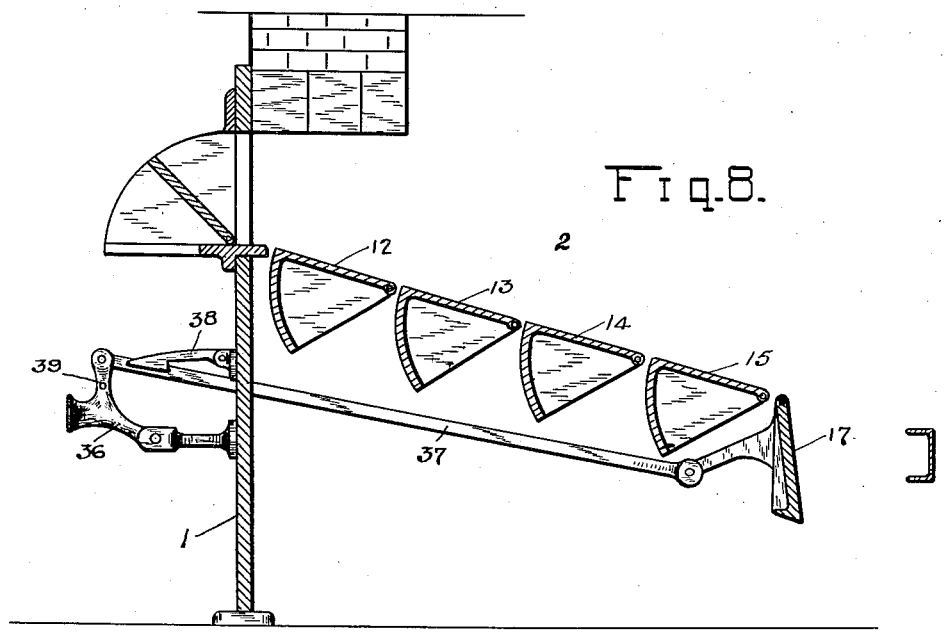
Figure 8 is a vertical sectional view taken on the line 8—8 of Fig. 1, and looking in the direction of the arrows.

The means for operating the dump grates 16 and 17 is clearly shown in Figure 8. An operating lever 36 is pivotally mounted at the front of the furnace, and this lever is connected to a depending arm of the dump grate by means of a link 37. A pawl 38 is adapted to engage the pin 39 on the operating lever and thus hold the dumping grate in its elevated position. Separate means are employed for operating the two dump grates, but the means are the same in construction.

Figure 9:
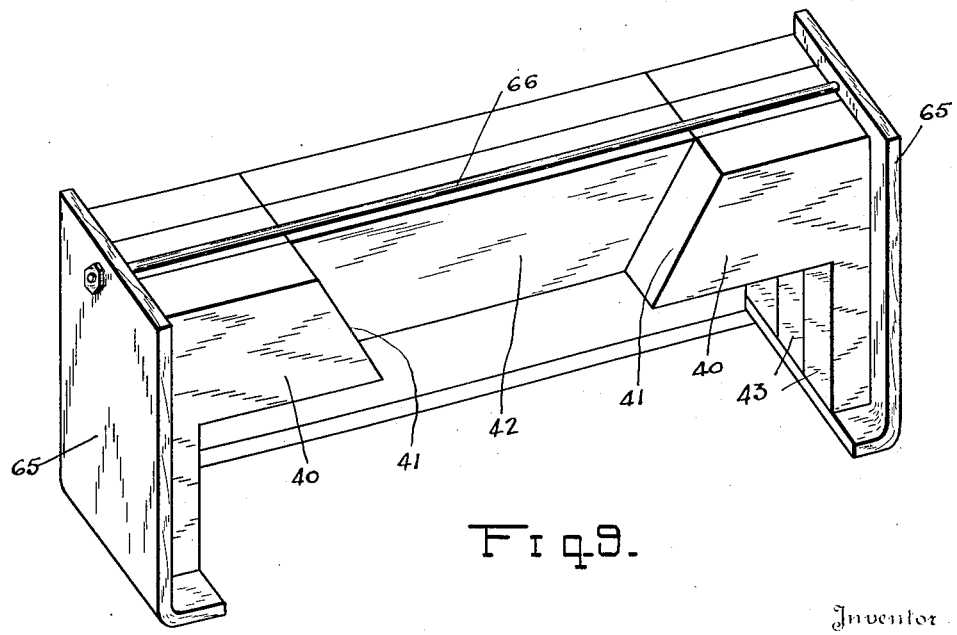
Figure 9 is a detail perspective view of the arch over the fuel entrance.

The construction of the arch over the fuel entrance is clearly shown in Figure 9. While a flat arch is shown it will be obvious that the construction is equally well adapted to use with curved arches. The particular construction is obvious from the drawings and consists of end bricks 40, 40, having downwardly and inwardly inclined faces 41, 41. A central brick 42 having its ends correspondingly inclined to the end bricks, is adapted to fit in between the end bricks, and to be supported thereby. The end bricks may be provided with the downwardly extending legs 43. For the purpose of relieving the furnace side walls of the pressure of the arch, I provide end plates 65 which abut the end walls, and these end plates are connected by one or more stay rods 66. Preferably the end plates are of cast iron and have the shape of angle irons.

The particular means for operating manually one of the hopper doors is shown in Figure 11. Mounted on a bracket 44 is a substantially centrally mounted bent lever 45, which is connected with the hopper door by means of a link 46. Holes 47 are provided in the bracket for the purpose of holding the hopper door in adjusted position.

For reasons which will appear hereinafter, it is an essential feature of the invention that the segmental gears 21 be angularly adjustable on the driving shaft 4. Any desired means may be employed for securing this angular adjustment, but the means disclosed herein consists of a set screw 48, as shown in Figure 12.

The means for operating the stoker driving shaft will now be described.

It is not essential or desirable that a stoker of the character described herein be operated continuously, and if operated continuously the wear and tear is greater, and the rocking feeding bars are burned out more quickly. I have therefore devised a means whereby the stoker will be automatically operated at intervals, whereby the intervals may be varied, and whereby the length of the period during which the stoker operates at each interval may be varied.

With reference to Figures 1, 10, 13 and 14, the clutch 5 is composed of two clutch members 49 and 50, the member 49 being fixed to the shaft 51, and the member 50 being slidably keyed on the stoker driving shaft 4. For manually operating the clutch I provide an operating lever 52.

For automatically engaging and disengaging the clutch at intervals, a coil 53 is wound around the clutch member 49, and when this coil is energized the clutch member is magnetized and thereby attracts the clutch member 50, and when the coil is deenergized the spring 54 throws the clutch member 50 out of engagement.

A circuit 55 leading to any source of electricity is connected with the coil by means of shoes 57 and 58.

The specific means which I have disclosed for closing and opening the circuit, and thereby energizing and deenergizing the magnetic coil, will now be described.

Two arc-shaped members 70 and 71 have contacts 72 and 73 at the ends thereof, the contacts being slightly spaced and being insulated from the body portion as shown. One of the leads of the circuit 55 is connected with these contact plates. A member 59 having a contact member 74 at the end thereof, is slowly rotated, and when contact 74 engages both of the contacts 72 and 73, the circuit will be closed, the magnetic coil will be energized, and the two clutch members will engage; whereby the stoker will commence to operate and will continue to operate until the arm passes out of contact with one of the contact plates 72 and 73, at which time the circuit will be opened and the spring 54 will throw the clutch members out of engagement. The width of contact member 74 may be such that it will maintain the circuit closed for sufficient time to complete one cycle of the stoker operation; and if desired any suitable means may be provided for increasing the width of contact member 74, so that the period of stoker operation will be increased.

The member 59 is rotated through gearing, as clearly shown in Fig. 1, and the speed with which the arm rotates, and hence the frequency with which the arm closes the circuit, will be varied as desired by changing the ratios of the gears; and, of course, the frequency with which the circuit is closed may also be varied by providing a member 59 carrying a plurality of contacts. The member 59 may be driven by any desired means, but I prefer an ordinary gear and worm drive. It is also obvious that, instead of operating the shaft 4 intermittently, the same may be operated continuously, if preferred.

The means which have previously been described for rocking the grates from the driving shaft, are capable of adjustments whereby practically any desired manner of operation of the grate bars may be obtained. That is, the segmental gears for engaging the pinions may be adjusted angularly to any desired position. They may be arranged so that grates 8 and 10 will be operated first, followed by grates 13 and 15, then 9 and 11, then 12 and 14; or the order of operation may be as follows, first, grates 8 and 10, then 12 and 14, then 9 and 11, then 13 and 15; or it may be as follows, first grates 8 and 10, and 12 and 14, operated simultaneously, followed by 9 and 11 and 13 and 15 operated simultaneously. Or it would be possible to adjust the segmental gears so that all of the grates would be operated simultaneously. The wide range of selectivity which is possible with the stoker, is thus obvious.

It will also be obvious that any of the grate bars may be operated by hand, at any time, and without first disconnecting any parts. This is not true, of course, as to the hand operation of a particular grate in which the segmental gear and pinion happen to be in mesh at the time.

In accordance with the patent statutes, I have described what I now believe to be the best embodiment of my invention, but I do not wish to be understood thereby as limiting myself or the scope of my invention, as many modifications may be made without departing from the spirit of the invention, and all such I aim to include in the scope of the appended claims.

What I claim as new and desire to secure by Letters Patent is:

1. A stoker including rocking feeding bars, means for operating the bars mechanically, and means for operating the bars manually, the operability of the manual operating means being dependent upon the angular position of the mechanical operating means.

2. A stoker including rocking feeding bars, a stoker driving shaft, means on said shaft for selectively operating the rocking bars, and means for operating the bars manually when not being operated by the driving shaft.

3. A stoker including rocking feeding bars, a hand lever connected with and adapted to operate said bars, and means for operating said lever mechanically at intervals.

4. A stoker including rocking feeding bars, a hopper having a movable wall, a driving shaft, means operatively connecting the driving shaft with the rocking bars and with the movable wall, said means being effective in certain positions only of the driving shaft.

5. A stoker including rocking feeding bars, a hopper having a movable wall, a driving shaft, a segmental gear carried by the driving shaft, and means engaged by the segmental gear for operating the rocking feeding bars and movable wall.

6. A stoker including rocking feeding bars, a hopper, said hopper having a movable wall, said wall being pivotally mounted at its lower edge, substantially at the furnace front and adapted to project through the furnace opening, an operating lever, means operatively connecting the rocking feeding bars with the lever, and means operatively connecting the movable hopper wall with the lever.

7. A stoker, a hopper arranged at the front of said stoker, one wall of the hopper being movable, said wall being pivotally mounted at its lower edge substantially at the furnace front and being of less height than the fuel feeding opening, whereby it may project into the furnace opening, for the purpose described.

8. A stoker, a hopper arranged at the front of said stoker, one wall of the hopper being movable, means for holding the wall in adjusted position, said wall being pivotally mounted at its lower edge substantially at the furnace front and being of less height than the fuel feeding opening, whereby it may project into the furnace opening, for the purpose described.

9. A stoker, a hopper arranged at the front of said stoker, one wall of the hopper being movable, a lever substantially centrally balanced and mounted adjacent to the movable wall, and means for operatively connecting said lever and wall.

10. In a furnace, a stoker, a driving shaft for operating the stoker, and means for automatically engaging and rotating said driving shaft at predetermined intervals.

11. In a furnace, a stoker, a driving shaft for operating the stoker, means for rotating the driving shaft, a clutch for connecting said driving shaft and said rotating means, and means for engaging and disengaging said clutch at predetermined intervals.

12. In a furnace, a stoker, a driving shaft for operating the stoker, a motor for rotating the driving shaft, a clutch for connecting the stoker driving shaft to the motor shaft, and electrical means for engaging and disengaging said clutch at predetermined intervals.

13. In a furnace, a stoker, a driving shaft for operating the stoker, a motor for rotating the driving shaft, clutch members for connecting the stoker driving shaft and the motor shaft, one of said clutch members including a magnetic coil, whereby the other clutch member will be attracted to it when said coil is energized.

14. In a furnace, a stoker, a driving shaft for operating the stoker, a motor for rotating the driving shaft, clutch members for connecting the stoker driving shaft and the motor shaft, one of said clutch members including a magnetic coil, an electric circuit connected with the magnetic coil, and means driven by said motor for opening and closing said circuit.

VASIL MacKAY.